(12) United States Patent
Huang

(10) Patent No.: US 6,282,530 B1
(45) Date of Patent: Aug. 28, 2001

(54) DIGITAL NEURAL NODE

(75) Inventor: Shi-Fong Huang, Tainan Hsien (TW)

(73) Assignees: Helios Semiconductor Inc., San-Chung (TW); Nano Semiconductor Technology Inc., MO (US)

( * ) Notice: Subject to any disclaimer, the term of this patent is extended or adjusted under 35 U.S.C. 154(b) by 0 days.

(21) Appl. No.: 09/329,108

(22) Filed: Jun. 9, 1999

(51) Int. Cl.$^7$ .................................................. G06N 3/02
(52) U.S. Cl. ................................. 706/41; 706/26; 706/45
(58) Field of Search .................................. 706/41, 26, 45

(56) References Cited

U.S. PATENT DOCUMENTS

| | | | |
|---|---|---|---|
| 5,504,839 | * | 4/1996 | Mobus ..................................... 706/26 |
| 5,515,477 | * | 5/1996 | Sutherland ............................. 706/41 |
| 5,742,741 | * | 4/1998 | Chiueh et al. .......................... 706/41 |
| 5,751,913 | * | 5/1998 | Chiueh et al. .......................... 706/41 |

OTHER PUBLICATIONS

Johansson, H.O.; Larsson, P.; Larsson–Edefors, P.; Svensson, C., A 200–MHz CMOS bit–serial neural network, ASIC Conference and Exhibit, 1994. Proceedings., Seventh Annual IEEE International, 1994, pp.: 312–315.*

Douglas, R.J.; Mahowald, M.A.; Martin, K.A.C., Hybrid analog–digital architectures for neuromorphic systems, Neural Networks, 1994. IEEE World Congress on Computational Intelligence., 1994 IEEE, International Conference on, vol.: 3, 1994, pp.: 1848–.*

Hung, D.L.; Jun Wang, A FPGA–based custom computing system for solving the assignment problem, FPGAs for Custom Computing Machines, 1998. Proceedings. IEEE Symposium on, 1998, pp.: 298–299.*

* cited by examiner

*Primary Examiner*—Kakali Chaki
*Assistant Examiner*—Wilbert L. Starks, Jr.
(74) *Attorney, Agent, or Firm*—Jiawei Huang; J.C. Patents

(57) ABSTRACT

Disclosed is a digital neural node according to the invention. The digital neural node, electrically coupled to n information processing units (n is an integer larger than 1), includes n data access devices. Each data access device has an input port, a first output port, a second output port, a third output port, . . . and an (n–1)th output port, and is electrically coupled to a uniquely corresponding information processing unit through the input port and to the other information processing units through the first output port, the second output port, the third output port, . . . and the (n–1)th output port, respectively. In accordance with the inventive digital neural node structure, each information processing unit can write digital data in a uniquely corresponding data access device, and the other information processing units can read the digital data at the same time.

5 Claims, 1 Drawing Sheet

DIGITAL NEURAL NODE

BACKGROUND OF THE INVENTION

1. Field of the Invention

The invention relates to a neural node, and more particularly to a digital neural node through which digital data can be directly, rapidly transmitted among externally coupled information processing units without any additional signal conversion.

2. Description of the Related Art

For manufacturing consumer products with human senses-like functions, a widely used parallel-processing CPU can no longer meet requirements. Instead, a neural network having a plurality of artificial neurons is used to perform the human senses-like functions. A neural network, an information processing unit, is inspired by the way in which a human brain performs a particular task or function of interest. Furthermore, in a neural network, there exits a plurality of neural nodes which are electrically coupled among a plurality of neurons. The neural nodes mainly serves as communication bridges among the plurality of neurons coupled thereto.

FIG. 1 is a block circuit diagram illustrating an analog neutral node according to the prior art. Referring to FIG. 1, an analog neural node 10 consists essentially of a resistor R. One end of the resistor R is electrically coupled to ground while the other thereof is electrically coupled to neurons 12, 14 and 16. Each of the neurons 12, 14 and 16 includes a CPU, an analog/digital converter (ADC), a digital/analog converter (DAC).

As to the operation of the above-stated analog neural node 10, when each neuron transmits a digital data signal to the other neutrons, the internal DAC thereof first converts the transmission required digital data signal into an analog data signal by adding a different level of DC signal and then, outputs the analog data signal to the analog neural node 10. At this time, other neurons can read the analog data signal from the analog neural node 10 and convert it into the original digital data signal according to the different DC level signal by using the ADCs thereof. As can be known from the above, the analog neural node 10 is only used to serve as a data communication bridge among the neurons 12, 14 and 16.

Although digital data can be transmitted among the neurons 12, 14 and 16 through the analog neural node 10, the analog neural node 10 has the following disadvantages:

(1) The data transmission rate through the analog neural node is limited by conversions between digital and analog signals and is also limited by bit-by-bit data transmissions;

(2) The number of the externally coupled neurons cannot be unlimitedly increased because each digital data signal to be transmitted must be converted into a corresponding analog data signal by adding a different level of DC signal (i.e., the levels of DC signals are limited);

(3) Additional ADCs and DACs for each neuron must be used, causing higher power consumption; and (4) Additional ADCs and DACs for each neuron must be used, resulting in higher costs.

SUMMARY OF THE INVENTION

To resolve the above-stated problems, the invention provides a digital neural node. The inventive digital neural node, electrically coupled to n information process units (n is an integer larger than 1), includes n data access devices, each data access device having an input port, a first output port, a second output port, a third output port, . . . and an (n−1)th output port. Each data access device is electrically coupled to a uniquely corresponding information processing unit through the input port and is electrically coupled to the other information processing units through the first output port, the second output port, the third output port, . . . and the (n−1)th output port, respectively. In accordance with the digital neural node, each information processing unit can write digital data in a uniquely corresponding data access device, and the other information processing units can simultaneously read the digital data.

The inventive digital neural node not only resolves the problems of the conventional analog neural node, but also has the following advantages:

(1) The number of the input/output ports is expandable;

(2) The data transmission rate among the information processing units is independent of the number of the information processing units externally coupled;

(3) Since digital data are directly transmitted without any signal conversion, a higher data transmission rate can be obtained; and (4) Regardless of the number of the information processing units electrically coupled to the digital neutral node of the invention, each information processing unit has a unique path (i.e., a uniquely corresponding data access device electrically coupled) through which digital data can be directly, rapidly transmitted to the other information processing units. Therefore, it is one of reasons to cause the data transmission rate increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate an embodiment of the invention and, together with the description, serve to explain the principles of the invention. In the drawings.

DETAILED DESCRIPTION OF THE PREFERRED EMBODIMENT

Figure 1:
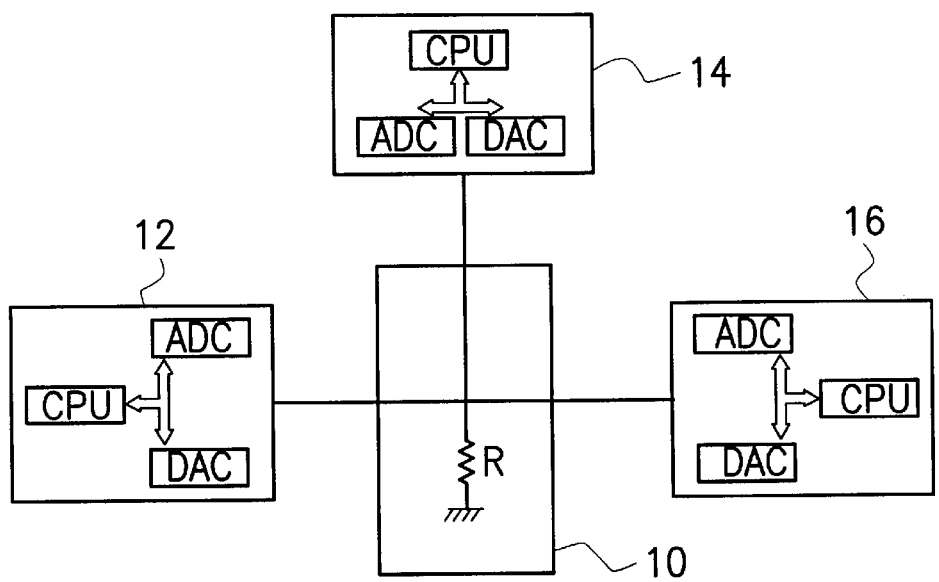
FIG. 1 is a block circuit diagram illustrating an analog neural node according to the prior art.
Figure 2:
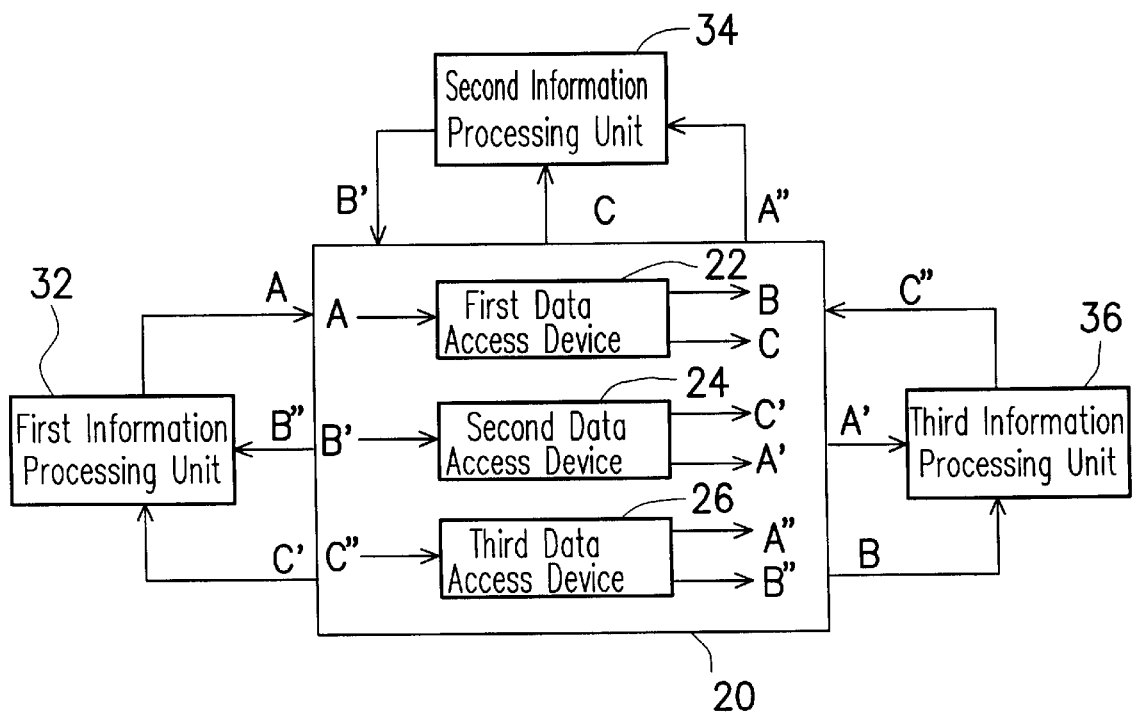
FIG. 2 is a block circuit diagram illustrating a digital neural node according to a preferred embodiment of the invention.

Referring to FIG. 2, a digital neural node according to a preferred embodiment of the invention is shown. In FIG. 2, a digital neutral node 20 is externally, electrically coupled to a first information processing unit (for example, a neuron or neural network) 32, a second information processing unit (for example, a neuron or neural network) 34 and a third information processing unit (for example, a neuron or neural network) 36. The neural node 20 includes a first data access device (for example, a random access memory (RAM) or register) 22, a second data access device (for example, a random access memory or register) 24 and a third data access device (for example, a random access memory or register) 26. The first data access device 22 has an first input port A and two output ports B, C and is electrically coupled to the first information processing unit 32 through the input port A and is electrically coupled to the third information processing unit 36 and the second information processing unit 34 through the output ports B, C, respectively. Similarly, the second data access device 34 has an input port B' and two output ports C', A' and is electrically coupled to the second information processing unit 34 through the input port B' and is electrically coupled to the first information processing unit 32 and the third information processing unit 36 through the output ports C', A', respectively. Also, the third data access device 26 has an input port C" and two output ports A", B" and is electrically coupled to the third information processing unit 36 through the input port C" and is electrically coupled to the second information processing unit 34 and the first information processing unit 32 through the output ports A", B", respectively.

Furthermore, it can be obviously seen from the inventive digital neural node 20 as shown in FIG. 2 that the first data processing unit 32 can write digital data in the first data access device 22 through the input port A. At the same time, the second information processing unit 34 and the third information processing unit 36 can directly read the digital data from the first data access device 22 through the two output ports C, B, respectively.

As to the second data access device 24, the second information processing unit 34 can write digital data in the second data access device 24 through the input port B'. At this point, the first information processing unit 32 and the third information processing unit 36 can directly read the digital data from the second data access device 24 through the output ports C', A', respectively.

Likewise, with respect to the third data access device 26, the third data processing unit 36 can write digital data in the third data access device 26 through the input port C". At the same time, the first information processing unit 32 and the second information processing unit 34 can directly read the digital data from the third data access device 26 through the output ports A", B", respectively.

Moreover, in the inventive digital neural node 20, the number of data access devices is the same as that of the input/output ports of each data access device. Also, the number of the data access devices is the same as that of externally connected information processing units. In this preferred embodiment, 3 data access devices, 3 input/output ports (including an input port and two output ports) and 3 information processing units are taken as an example.

Compared to the prior analog neural node, the digital neural node of the invention not only resolves the problems of the prior analog neural node, but also has the following advantages:

(1) The number of the input/output port is expandable;

(2) The data transmission rate among the information processing units is independent of the number of the information processing units externally coupled;

(3) Since digital data are transmitted without any signal conversion, a higher data transmission rate can be obtained; and (4) Regardless of the number of the information processing units electrically coupled to the digital neutral node of the invention, each information processing unit has a unique path (i.e., a uniquely corresponding data access device electrically coupled) through which a digital data signal can be directly, rapidly transmitted to the other information processing units. Therefore, it is one of reasons to increase the data transmission rate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A digital neural node electrically coupled to n information processing unit, wherein n is an integer larger than 1, the digital neural node comprising:

n data access devices, each data access device having an input port, a first output port, a second output port, a third output port, . . . and an (n−1)th output port, and electrically coupled to a corresponding information processing unit through the input port and electrically coupled to the other information processing units through the first output port, the second output port, the third output port, . . . , and the (n−1)th output port, respectively, wherein each information processing unit can write digital data in a corresponding data access device, and the other information processing units can read the digital data at the same time.

2. The digital neural node as set forth in claim 1, wherein each information processing unit is a neuron.

3. The digital neural node as set forth in claim 1, wherein each information processing unit is a neural network.

4. The digital neural node as set forth in claim 1, wherein each data access device is a random access memory (RAM).

5. The digital neural node as set forth in claim 1, wherein each data access device is a register.

\* \* \* \* \*